US010178642B1

United States Patent
Posner et al.

(10) Patent No.: US 10,178,642 B1
(45) Date of Patent: Jan. 8, 2019

(54) SYSTEM AND METHOD FOR PROVIDING ALTERNATE WIRELESS AND NETWORK SERVICE IN A BANDWIDTH CONSTRAINED ENVIRONMENT

(71) Applicant: TIONESTA, LLC, San Antonio, TX (US)

(72) Inventors: Paul Posner, San Antonio, TX (US); Tim Clark, San Antonio, TX (US); Aaron Hamstra, Cibolo, TX (US); Ivan Knezevic, Santiago (CL)

(73) Assignee: TIONESTA, LLC, Austin, TX (US)

( * ) Notice: Subject to any disclaimer, the term of this patent is extended or adjusted under 35 U.S.C. 154(b) by 305 days.

(21) Appl. No.: 14/012,736

(22) Filed: Aug. 28, 2013

Related U.S. Application Data

(60) Provisional application No. 61/693,871, filed on Aug. 28, 2012.

(51) Int. Cl.
*H04W 24/00* (2009.01)
*H04W 60/04* (2009.01)

(52) U.S. Cl.
CPC .................... *H04W 60/04* (2013.01)

(58) Field of Classification Search
CPC ....... H04W 4/001; H04W 4/006; H04W 4/04; H04W 4/046; H04W 4/08; H04W 4/16; H04W 4/18; H04W 4/203; H04W 8/02; H04W 8/04; H04W 8/06; H04W 8/08; H04W 8/082; H04W 8/10; H04W 8/18; H04W 8/186; H04W 8/20; H04W 8/205; H04W 8/22; H04W 8/24; H04W 28/021; H04W 28/0226; H04W 36/06; H04W 36/10; H04W 36/12; H04W 36/14; H04W 36/365; H04W 36/36; H04W 40/02; H04W 40/22; H04W 40/32; H04W 40/34; H04W 72/02; H04W 72/0426; H04W 72/0433; H04W 72/044; H04W 84/005; H04W 84/02; H04W 84/10; H04W 84/12; H04W 84/14; H04W 84/16; H04W 84/105
USPC ..... 455/432.1–432.3, 433, 445, 456.1–456.6
See application file for complete search history.

(56) References Cited

U.S. PATENT DOCUMENTS

| | | | | |
|---|---|---|---|---|
| 6,035,178 A | * | 3/2000 | Chennakeshu | H04B 7/18578 455/12.1 |
| 7,664,103 B2 | | 2/2010 | Chu et al. | |
| 7,756,508 B1 | * | 7/2010 | Usher | H04B 7/18506 455/411 |
| 7,809,381 B2 | | 10/2010 | Aborn et al. | |
| 7,818,008 B2 | * | 10/2010 | Kalavade | 455/445 |
| 8,457,627 B2 | * | 6/2013 | Lauer | H01Q 1/007 455/431 |

(Continued)

*Primary Examiner* — Anthony S Addy
*Assistant Examiner* — Matthew W Genack
(74) *Attorney, Agent, or Firm* — Osha Liang LLP

(57) ABSTRACT

Methods and systems for providing alternate wireless and network service on a cruise ship or in other remote or isolated "captive" environments where available wireless communication options tend to be limited and/or bandwidth constrained. Aspects of the disclosed systems and methods allow existing wireless customers to continue using their normal wireless phone and phone number in the captive environments while still easily avoiding large roaming and bandwidth charges, all while nearly transparently maintaining the full range of normal wireless voice, text, and MMS services.

5 Claims, 6 Drawing Sheets

(56) References Cited

U.S. PATENT DOCUMENTS

| | | | |
|---|---|---|---|
| 8,488,556 B2* | 7/2013 | Muirhead | H04B 7/18506 370/331 |
| 2004/0142658 A1* | 7/2004 | McKenna et al. | 455/11.1 |
| 2007/0167167 A1 | 7/2007 | Jiang | |
| 2007/0239859 A1* | 10/2007 | Wilkinson | G06F 9/505 709/220 |
| 2007/0254631 A1* | 11/2007 | Spooner | G06F 21/6218 455/411 |
| 2008/0153480 A1 | 6/2008 | Jiang | |
| 2008/0304462 A1 | 12/2008 | Burgess et al. | |
| 2009/0262733 A1* | 10/2009 | Olson | 370/389 |
| 2009/0286510 A1* | 11/2009 | Huber et al. | 455/410 |
| 2010/0042476 A1* | 2/2010 | Gauri | G06Q 30/02 705/7.29 |
| 2010/0056144 A1* | 3/2010 | Gallagher et al. | 455/435.1 |
| 2011/0096771 A1 | 4/2011 | Saru et al. | |
| 2013/0110905 A1* | 5/2013 | Howe | H04L 67/42 709/203 |

\* cited by examiner

SYSTEM AND METHOD FOR PROVIDING ALTERNATE WIRELESS AND NETWORK SERVICE IN A BANDWIDTH CONSTRAINED ENVIRONMENT

BACKGROUND OF THE INVENTION

1. Field of the Invention

The present invention is directed generally to improvements in the field of wireless interconnected telecommunication systems and methods, especially systems and methods for providing alternate voice, text, picture and/or data service on cruise ships or in other remote, isolated and/or bandwidth constrained environments, which for purposes of these descriptions may be referred to as "captive environments" via WiFi and VoIP.

2. Description of Related Art

Wireless interconnected telecommunication services such as VoIP have long been an alternative to conventional cellular, PBX, and other voice and messaging type communication systems and services. "VoIP" refers to "Voice over Internet Protocol," a designation which has evolved to commonly refer to a wide array of communication protocols, technologies, methodologies, and transmission techniques involved in the delivery of voice and multimedia communication sessions over Internet Protocol (IP) networks, such as the Internet and typical Local Area hardwired and WiFi networks. Within the VoIP universe, some of the more popular examples of network protocols include Session Initiation Protocol (SIP), Real-time Transport Protocol (RTP), Inter-Asterisk eXchange (IAX), Session Description Protocol (SDP), H.323, and Media Gateway Control Protocol (MGCP), each of which may also include its own array of protocol permutations.

Although Wireless interconnected services and related systems are widely available as alternatives to conventional cellular-based telecommunications services in most markets, that availability has historically been dramatically diminished where competition tends to be limited, such as on cruise ships and in other captive environments. In such remote, relatively non-competitive business environments, many service providers have the opportunity to lock customers onto their networks and charge exorbitant fees—for seemingly any and all device-based voice and/or data communications, whether hardwired or wireless. Moreover, end users in captive environments often receive limited voice, data, text, and Multimedia Messaging Service (MMS, a standard for picture messaging) services as compared to services available in typical metropolitan or other land-based areas.

Even further challenges arise in captive environments when "roaming"—a term typically referring to the extension of wireless telecommunication service to a location that is different from the home location where the wireless device's end user registered with a home carrier for service. Roaming is enabled by cooperative inter-carrier agreements that helps ensure that any cellular device receives service despite being outside the home service provider's network. Cruise ship companies typically form arrangements with a single telecommunications carrier to provide services on the ship. The carriers providing service in captive environments such as cruise ships typically charge large fees and dramatically limit access while roaming. As a result, end users in such environments often and easily incur charges that greatly exceed their expected monthly bill.

Although aspects of the present invention may apply in captive environments other than on cruise ships to the extent such applications still fall within the enforceable scope of the corresponding patent claims, the prior art problems exemplified above are especially aggravated on cruise ships. Cruise ships travel through the ocean and are often in international ports or out of sight of land. On the ocean, cruise ships typically have only a very limited data connection to the internet via satellite. Moreover, because cruise ship travelers are a captive audience with little or no competition for the provision of telecommunications services, and because cruise ship operators tend to have limited technical competencies in how to provide telecommunications services, end users often are not able to receive services similar to those they receive while land-based.

Even when and to the extent that communication services are available on a cruise ship, the available communications service providers contracted by cruise ships typically exact exorbitant fees. The exorbitant fees not only affect voice calls from cellphones, but they also apply to telephone calls from PBX-type "hard wired" phones, to wired or wireless data connections to the Internet, and to other services typically provided by wireless phone companies such as SMS and MMS messaging as well as wireless data charges to the end user device (as opposed to a computer). Cellular phone service is exorbitantly expensive. For example, a ship to shore telephone call from a PBX-type phone in the cruise ship passenger's room typically costs $4-5 per minute. Wireless services including calling, text and picture messaging are, more often than not, unavailable and/or incur similarly exorbitant fees. In addition, the passenger must often provide a different telephone number to his contacts on land if they wish to reach him during his cruise. These challenges and others leave wireless customers on a cruise ship with the unsatisfactory choice of either (A) paying huge fees for diminished wireless services or (B) doing without their normal wireless services.

Therefore and for many other reasons as may be known to those of ordinary skill in the art, there is a long felt unresolved need in the art for better systems and methods for providing alternate wireless voice and data communication systems and services on cruise ships. There is also thought to be a long felt unresolved need in the art for better systems and methods for providing alternate wireless voice and data communication systems and services in captive environments in general. Many other prior problems, limitations, obstacles and deficiencies (collectively, "challenges") will be generally known to those of skill in the art and will otherwise be evident from the following descriptions as well as from thoughtful consideration of any claims that may be added or appended hereto or to an application claiming priority hereto.

SUMMARY OF THE INVENTION

The present invention is directed to overcoming the challenges of the prior art through methods and systems of providing alternate wireless and network service in ways that innovatively overcome challenges encountered on cruise ships and, for some potentially more general aspects of the invention, in other captive environments. Some aspects of the invention allow wireless telecommunication customers to easily avoid large roaming and bandwidth charges while maintaining more of their full range of normal voice, text, and MMS services (for reference, collectively, "personal electronic communication services").

Embodiments of more particular aspects of the invention further have the benefit of being mostly transparent to the wireless user. In the principal preferred embodiment, a wireless user entering the captive environment enables functionality by the simple steps of registering their device through initiation with an On-Ship Server after installing an app (or the equivalent) on their cellular phone. The installed app is preferably adapted to partially automate the registration step and to temporarily disable the device's normal wireless radio (normally referred to as putting the phone into "airplane mode") while concurrently activating WiFi radio capabilities on the device. Hence, the principal embodiment allows a user to continue using their own smartphone (or other portable communication devices) with the same phone numbers and substantially the same functionality even when they undertake a remote trip on a cruise ship. Alternative embodiments potentially in the scope of the invention may be implemented in other modes as well, such as through alternate provision of pre-programmed dedicated handsets for use in the captive environment or using a different phone number.

Many embodiments of the current invention take advantage of the fact that most cruise ships have an installed, high capacity WiFi network providing ubiquitous wireless coverage throughout areas that passengers frequent on-board. Other aspects of many embodiments also capitalize on the fact that many cellphones, including most if not all current smartphones, are provided with WiFi communication capabilities.

Other embodiments of the present invention incorporate or utilize a local server in or in close proximity to the captive environment, which is programmed to manage call handling and other communications activities, preferably with differentiated logic for local (e.g., on-ship) communications versus ship-to-shore and shore-to-ship communications. For instance, with embodiments adapted for use for captive environments on cruise ships, such a local server is preferably stationed on-board the cruise ship. Such on-board server is preferably adapted to process voice, SMS and MMS communications as they are being sent to or from end users onboard the ship or, as the case may be for particular embodiments, in the remote and/or bandwidth-constrained environment. Recognizing that satellite bandwidth for backhaul is both limited and expensive, some alternative embodiments of the current invention provide for an on-board server which monitors network traffic, keeps on-ship passenger-to-passenger communication on ship utilizing high bandwidth speed, but filters and processes ship-to-shore communications.

Preferably, the on-board server logic in many embodiments also implements other forms of communication handling priorities as well, as will be evident from further descriptions herein. For instance, though Internet access for webpages and other data requests may still be limited, the on-board server may also have, or grant access to, data of particular interest to cruise ship passengers and deliver that data to the user's wireless phone, eliminating the need for large amounts of certain types of data to be broadcast over the limited bandwidth satellite connection. Alternatively, in some embodiments the data may be stripped out. Preferably, for ship-to-shore communications, a shoreside server is adapted to provide additional translation(s) for communications from the device app/on-board WiFi network delivering such communications using standard wire line, wireless, data and other interfaces and protocols, thus making all traffic appear as though it were roaming on a standard wireless network. In some embodiments the invention would circumvent traditional wireless and wireless networks altogether if the shoreside user is using an app utilizing the present invention.

Some embodiments of the invention may include a combination of the primary aspects of the invention together with an app that, when downloaded and operating on an end user device, enables connection of that device to a server capable of providing the alternate service. In preferred embodiments, the user located on the cruise ship connects via the cruise ship's WiFi network or at a remote switching center via the cruise ship's WiFi network in combination with a backhaul link, typically a satellite data connection. The app mimics all personal electronic communication services the end user is used to having when connected to his home wireless service network including similar user interface(s) on the device, making user interaction the same as he is used to. The app communicates directly with a server located either on board or on the other end of a backhaul link in a switching center. In the event of an on-board server, the server directs all traffic between passengers on the same cruise ship to stay on ship. As the throughput on a WiFi network is fast, except in extreme cases all calls, messages, files, and other applications can be passed between users at full, uncompressed, real time data rates. On the other hand, for traffic that goes from ship to shore, the server may perform a sorting function, isolate large files and other high bandwidth traffic, and allow the traffic to be compressed, delayed, or sent through immediately and where a premium can be charged for this service.

In addition, whereas the traveler is normally required to provide a temporary contact number to anyone on land who may wish to reach him while travelling, with the current invention the traveler may also be able to use his regular phone and phone number for all personal electronic communication services. Preferred embodiments of the invention accomplish this result through an integrated software app that connects through WiFi, one or multiple servers, a backhaul link (typically satellite), and the Internet to a specialized network infrastructure set up on the backend at a switching center which has a roaming link to the home service provider network.

It is a fact that satellite connections to a remote location such as a cruise ship where fiber optics and other physically connected high capacity services are not available are expensive and bandwidth constrained. A cruise ship typically utilizes a significant portion of the satellite connections it procures for transmission of operational data to the home office. While this is often done during "off peak" hours, even during those times, the delivery of certain types of traffic such as large spreadsheets or other data files, video transmissions such as YouTube, or even large photo files can use up an entire circuit for a considerable amount of time, thus eliminating or severely compromising the provision of similar services to other passengers. A cruise ship operator may wish to preclude large file transfer or other high bandwidth applications, provide delivery on a best efforts fashion with a time delay, or charge a premium for delivery real time. It is, therefore, in one embodiment of the current invention to segregate large files and provide the cruise ship operator an opportunity to process them according to a set of rules rather than letting all traffic pass real time.

Many other objects, features, advantages, benefits, improvements and non-obvious unique aspects of the present invention, as well as the prior problems, obstacles, limitations and challenges that are addressed, will be evident to the reader who is skilled in the art, particularly when this application is considered in light of the prior art. It is intended that such objects, features, advantages, benefits, improvements and non-obvious unique aspects are within the scope of the present invention, the scope of which is limited only by the claims of this and any related patent applications and any amendments thereto.

To the accomplishment of all the above, it should be recognized that this invention may be embodied in the form illustrated in the accompanying drawings, attention being called to the fact, however, that the drawings are illustrative only, and that changes may be made in the specifics illustrated or described. For purposes of these descriptions, it should be understood that (absent clear context otherwise) the terms "cellular phone" or "wireless device" or "wireless handset", or the like are generally considered interchangeable concepts that include, but are not limited to, mobile devices, smartphones, wireless phones, and wireless devices.

DETAILED DESCRIPTION OF PREFERRED EMBODIMENT

As previously stated, the present invention is directed to a method and system for providing alternate wireless and network service in a bandwidth constrained environment. In this document the terms client includes, but is not limited to customers and consumers. Client refers to any person or organization with an interest in contacting a person or organization. The term wireless phone includes, but is not limited to, mobile devices, smartphones, wireless phones, and wireless devices.

Figure 1:
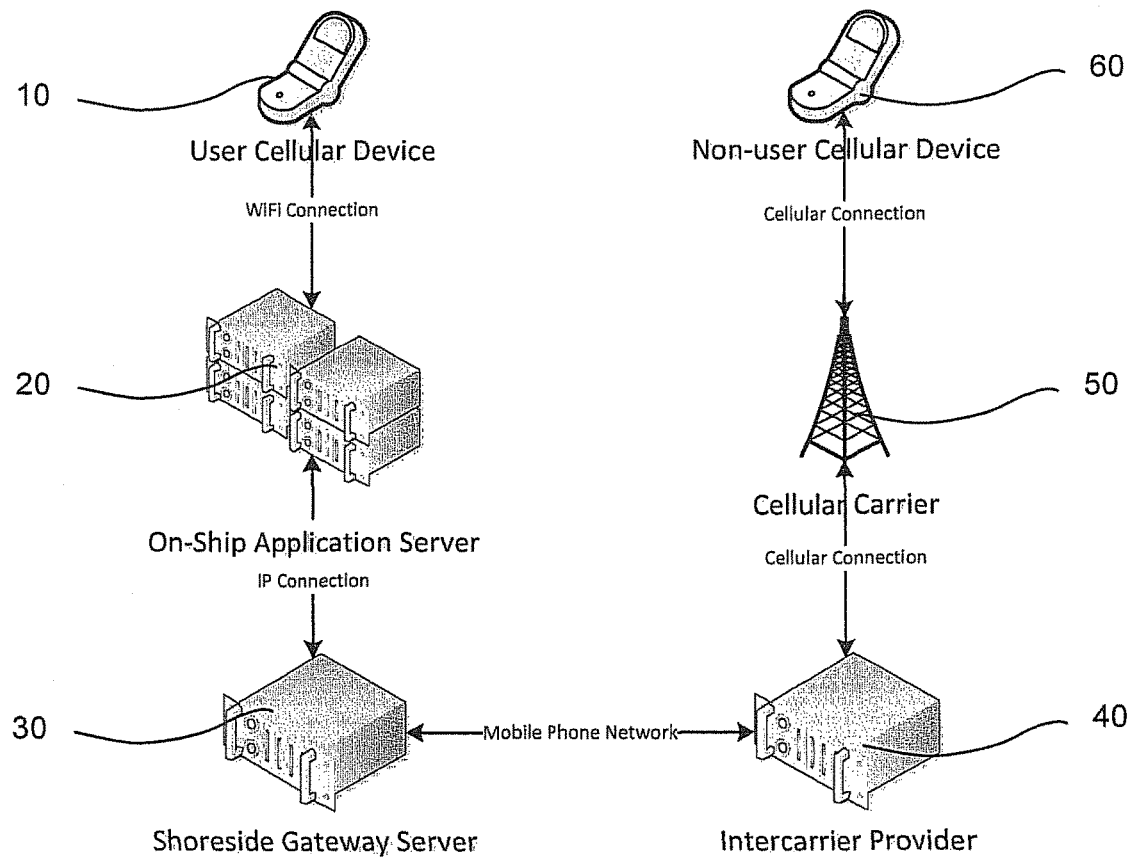
FIG. 1 is a high-level view of major components of a typical preferred embodiment of the present invention.

Turning to FIG. 1, which shows a high level view of a typical preferred embodiment of the present invention with all of its major components. The User Wireless Device 10 is any WiFi capable mobile communication device used by the user of the preferred embodiment. An example of the User Wireless Device 10 is the cell phone of a passenger on a cruise ship.

Figure 2:
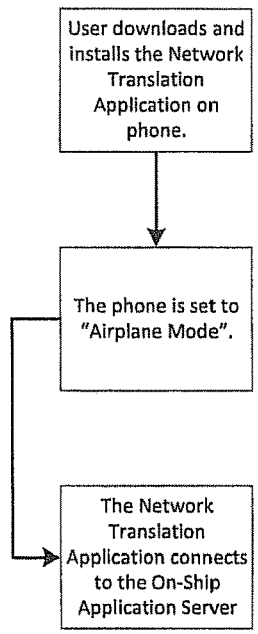
FIG. 2 is a flow diagram of basic steps for user initiation of functionality in conjunction with principal preferred embodiments of the present invention, preferably undertaken when a user first enters or commences enabled communications within the captive environment of a cruise ship.

With reference to FIG. 2, in order to enable use of the preferred embodiment, a user installs the Network Translation Application 15 on the User Wireless Device 10. In the preferred embodiment, User Wireless Device 10 is then set to "Airplane Mode" by the user (or, even more preferably, automatically by the NTA 15). Placing the device 10 in airplane mode effectively turns off the cellular radio in the Device, and the NTA 15 then activates WiFi functionality in the Device. In another embodiment, the Network Translation Application has intelligence built into it allowing the user, cellular service provider, WiFi network operator, or another party to automatically prioritize and/or select which form of wireless access (cellular, WiFi, other) the device will choose to operate on and turn other wireless access radios on and off. In the course of initiation for the Device 10, the NTA 15 preferably automatically guides the end user through a simplified process of registering the device for use with the on-board server.

The Network Translation Application 15 sends and receives the personal electronic communication sent to or by the User Wireless Device 10. To a user, the User Wireless Device 10 keeps all the functionality normally available over the wireless home service network. However, the Network Translation Application 15 communicates with the On-Ship Application Server 20 through WiFi or other wireless communications network instead of via a wireless network. In another form, the Application Server is not on the ship, but rather in a remote switching center.

The On-Ship Application Server 20 communicates with the Shoreside Gateway Server 30 via the cruise ship's internet connection. Shoreside Gateway Server 30 acts as a bridge between the invention and an Intercarrier Provider 40 through the normal mobile phone network interconnection circuits and protocols. The Intercarrier Provider 40 interfaces with a Cellular Carrier 50, which said Cellular Carrier 50 then interacts with the Non-user Wireless Device 60. This is described in further detail below.

Figure 3:
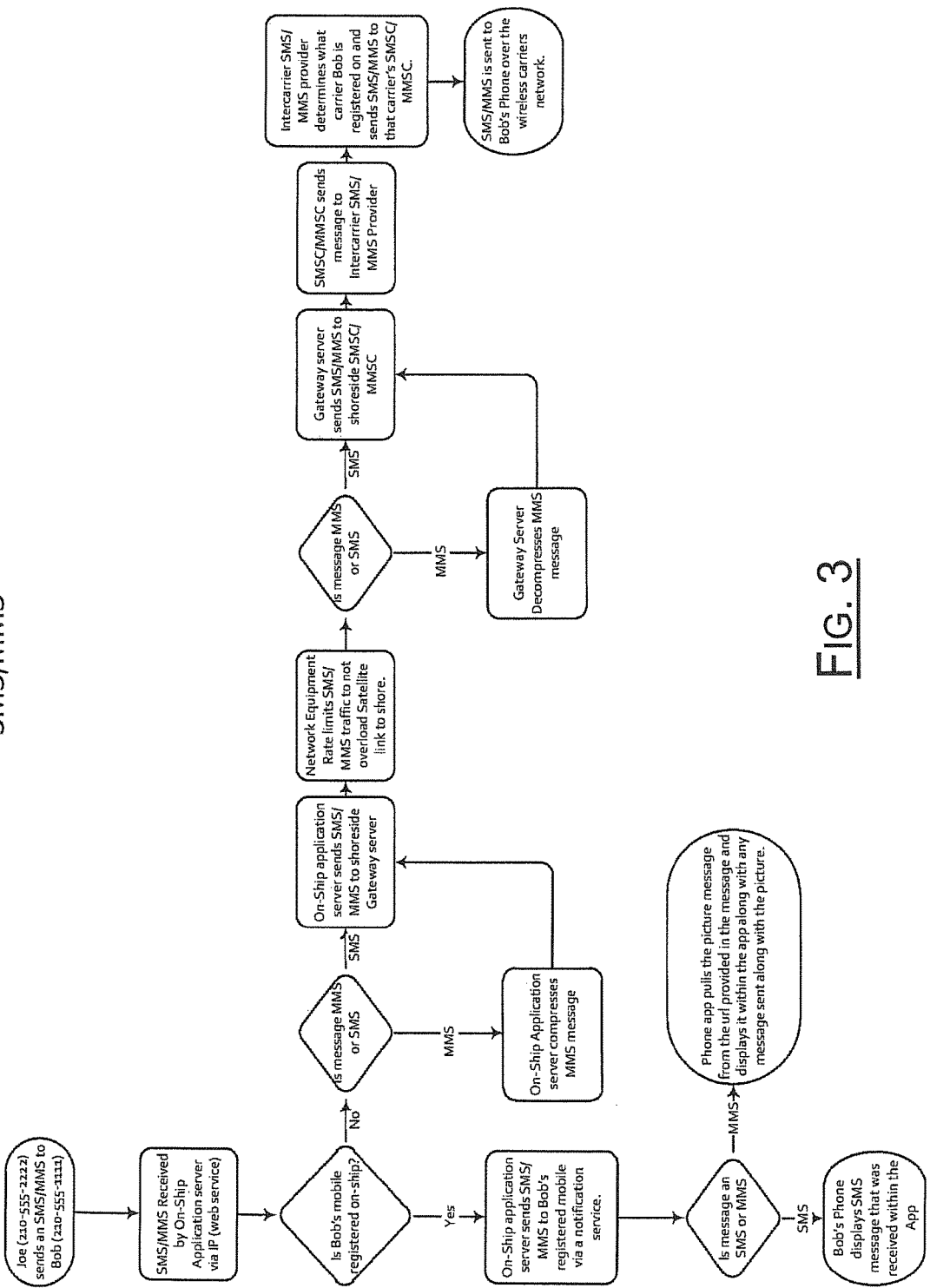
FIG. 3 is a flow diagram of a typical preferred embodiment of the present invention for the Cellular to WiFi/SMS/MMS/component of a principal preferred embodiment of the invention.

FIG. 3 describes the method and systems of the present invention using the example of a cruise ship passenger sending a personal electronic communication message to another wireless device. Prior to step 1, the user has already installed and correctly configured the Network Translation Application 15 on the user's User Wireless Device 10. The process begins with the user instigating a personal electronic communication message (hereinafter alternately referred to as the "communication") as the user would normally do. The Network Translation Application 15 sends the communication to the On-Ship Application Server 20 using a WiFi or other wireless connection and using the Internet Protocol (IP) or another protocol.

The On-Ship Application Server 20 determines if the receiving party's wireless device is registered on the cruise ship. If Server 20 determines that the receiving party's device is registered on the ship (for reference, a "Fellow Passenger"), the On-Ship Application Server 20 then preferably determines to handle the personal electronic communication locally, i.e., without transmitting the communication data to satellite networks or other networks outside the ship. Accordingly, for communication with a Fellow Passenger, the On-Ship Server 20 sends the communication to the Fellow Passenger directly over the ship's local networks, using a WiFi or other wireless connection and using IP or other suitable protocol for the ship's local networks. The Fellow Passenger device then receives the personal electronic communication and the On-Ship Application Server 20 commences background processes to emulate the conventional land-based experience for both the sending party and the receiving party. Hence, in the case of text or MMS messages, although some initialization may be necessary depending on the particulars of the app that enables the On-Ship personal electronic communication services, the Fellow Passenger device then displays the text or MMS message as appropriate. (As will be evident to those of ordinary skill in the art, MMS messages may actually be presented as a URL address pointer that, unbeknownst to most end users, points to a server location where the data for the full MMS message is stored for download to the Fellow Passenger device.) If the communication is voice, On-Ship Application Server 20 sets up a Voice Over Internet Protocol (VOIP) or other protocol session whereby the two parties can conduct a voice call.

If the On-Ship Application Server 20 determines that the receiving party's wireless device is not registered on the cruise ship (for reference, a "Shoreside Recipient"), the On-Ship Application Server 20 determines the nature of the communication and processes further transmission of the communication based on that determined nature. As and to the extent the communication is conveyed to the Shoreside Recipient according to the logic on the Server 20, the preferred typical mode of such communication is to send corresponding portions of the communication to the Shoreside Recipient via a Shoreside Gateway Server 30 over a satellite communications link. If the communication is an MMS message (for example, a picture message), the On-Ship Application Server 20 looks at the file size or other parameter(s) and determines whether the MMS message should be compressed prior to sending a corresponding communication to the Shoreside Recipient via Shoreside Gateway Server 30 over the satellite link, thus ensuring that the cruise ship's communications are within the bandwidth limits of the ship's internet connection and/or other decision rules dictated by the cruise ship, satellite link provider, or telecommunications service provider. In alternative embodiments the On-Ship Application Server 20 can apply a Quality of Service analysis of communications traffic. In this alternative the On-Ship Application Server 20 prioritizes the traffic according to defined criteria. For example, voice calls could be assigned the highest priority; MMS picture messages could be assigned a low priority, etc. In addition, the On-Ship Application Server 20 could delay certain communications to non-peak times, sending compressed files but holding the original, uncompressed files until the ship has docked or otherwise has gained access to a faster data connection which can be used to relay all messages that were held or delayed. In the alternative, the cruise ship or telecommunications service provider could provide the user the option to send or download the full, uncompressed file by paying a premium for real time service.

The On-Ship Application Server 20 forwards the communication to the Shoreside Gateway Server 30. In one embodiment network equipment limits communication traffic to prevent any overload of the cruise ship's satellite internet link.

The Shoreside Gateway Server 30 acts as a link between the IP traffic of the invention and the standard mobile phone network. When the user first downloads the Network Translation Application, the Shoreside Gateway Server 30 updates the home carrier's Visitor Location Register (VLR) of the Cellular Carrier 50. This sets User Wireless Device 10 as roaming on the Cellular Carrier 50. The Cellular Carrier 50 then routes all communications to the User Cellular Device 10 through the Shoreside Gateway Server 30. The Shoreside Gateway Server 30 un-compresses the communication if needed and forwards the communication through the normal mobile phone network to the Cellular Carrier 50 as is known in the art.

In one alternative the Shoreside Gateway Server 30 converts the VOIP communications to a voice communication format compatible with the normal mobile phone network. In other alternatives, the Shoreside Gateway Server 30 immediately updates the VLR in real time rather than using batch updates as is known in the art.

The Shoreside Gateway Server 30 passes the communication on through an Intercarrier Provider 40 through to a Cellular Carrier 50 and ultimately to a Shoreside Recipient Wireless Device 60 as is standard and known in the art for personal electronic communications.

Figure 4:
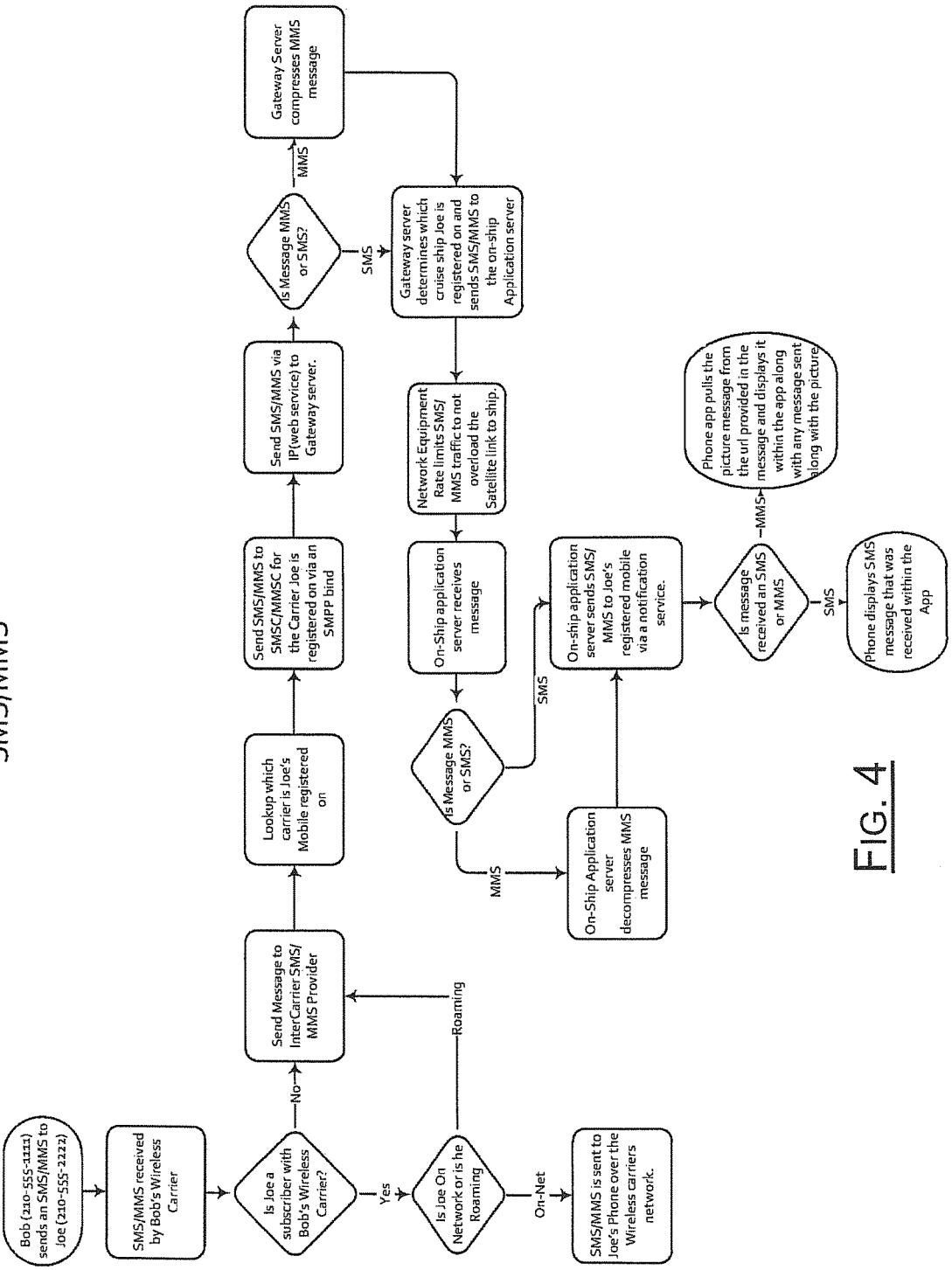
FIG. 4 is a flow diagram of a typical preferred embodiment of the present invention for the WiFi to Cellular/SMS/MMS component of a principal preferred embodiment of the invention.

Turning now to FIG. 4, which describes how communications from the normal mobile phone network are transmitted through to the User Wireless Device 10 using the present invention. A User Wireless Device 10 registered on the Shoreside Gateway Server 30 appears as roaming to the home Cellular Carrier 50. Communications sent to such a User Wireless Device 10 travels through the normal mobile phone network as is known in the art. When the communication reaches the Shoreside Gateway Server 30 it is analyzed according to its type. If the communication requires compression (such as a MMS message) the Shoreside Gateway Server 30 compresses the communication. The Shoreside Gateway Server 30 then determines which cruise ship the User Wireless Device 10 is registered on.

The Shoreside Gateway Server 30 sends the communication to the On-Ship Application Server 20 of the identified cruise ship. The Shoreside Gateway Server 30, in some embodiments, can provide QoS analysis, queuing, and prioritization of the communication to prevent bandwidth overload. The On-Ship Application Server 20 un-compresses the communication if required. The On-Ship Application Server 20 then sends the communication to the User Wireless Device 10. The communication is then accessible to the user via the Network Translation Application 15. In another embodiment, the Shoreside Gateway Server sends a message to the User Wireless Device 10 indicating that a large message was sent and is being held for later retrieval. It may provide some information about the message being held, for example the name of the sender, the name of the file, and/or a truncated, compressed version of all or part of the message.

The present invention therefore allows users on a cruise ship to use their normal phone and phone number to receive personal electronic communication messages while on ship and, in addition, avoid exorbitant roaming and/or access charges. Although the embodiment of this invention is discussed with application to cruise ships, alternative embodiments of certain aspects of the invention could also be used in situations where bandwidth is constraining the normal use of voice, data, text, and/or MMS messages.

Figure 5:
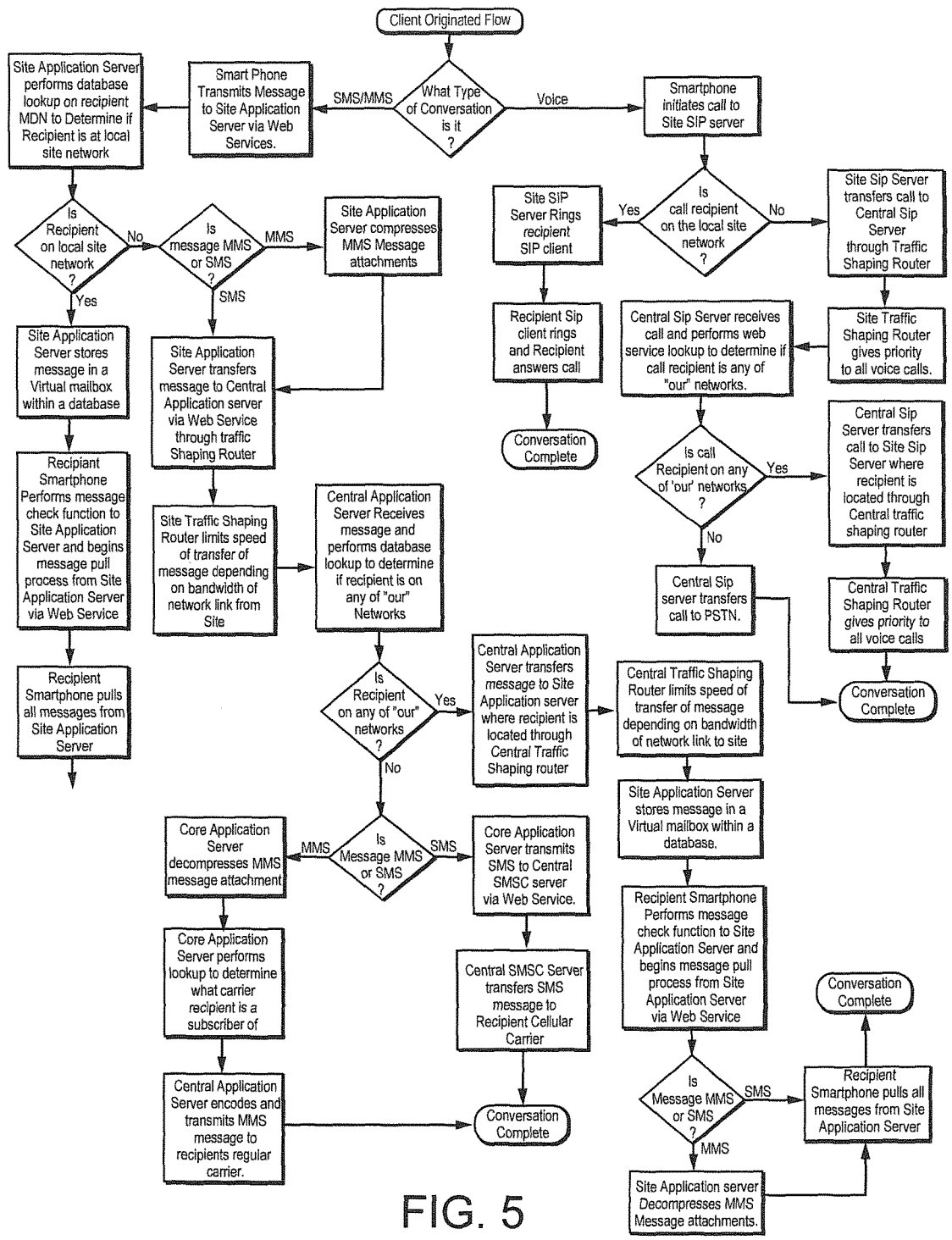
FIG. 5 is a flow diagram providing an alternate perspective and variations of a typical embodiment of the present invention for initiating and handling wireless data or voice communications.
Figure 6:
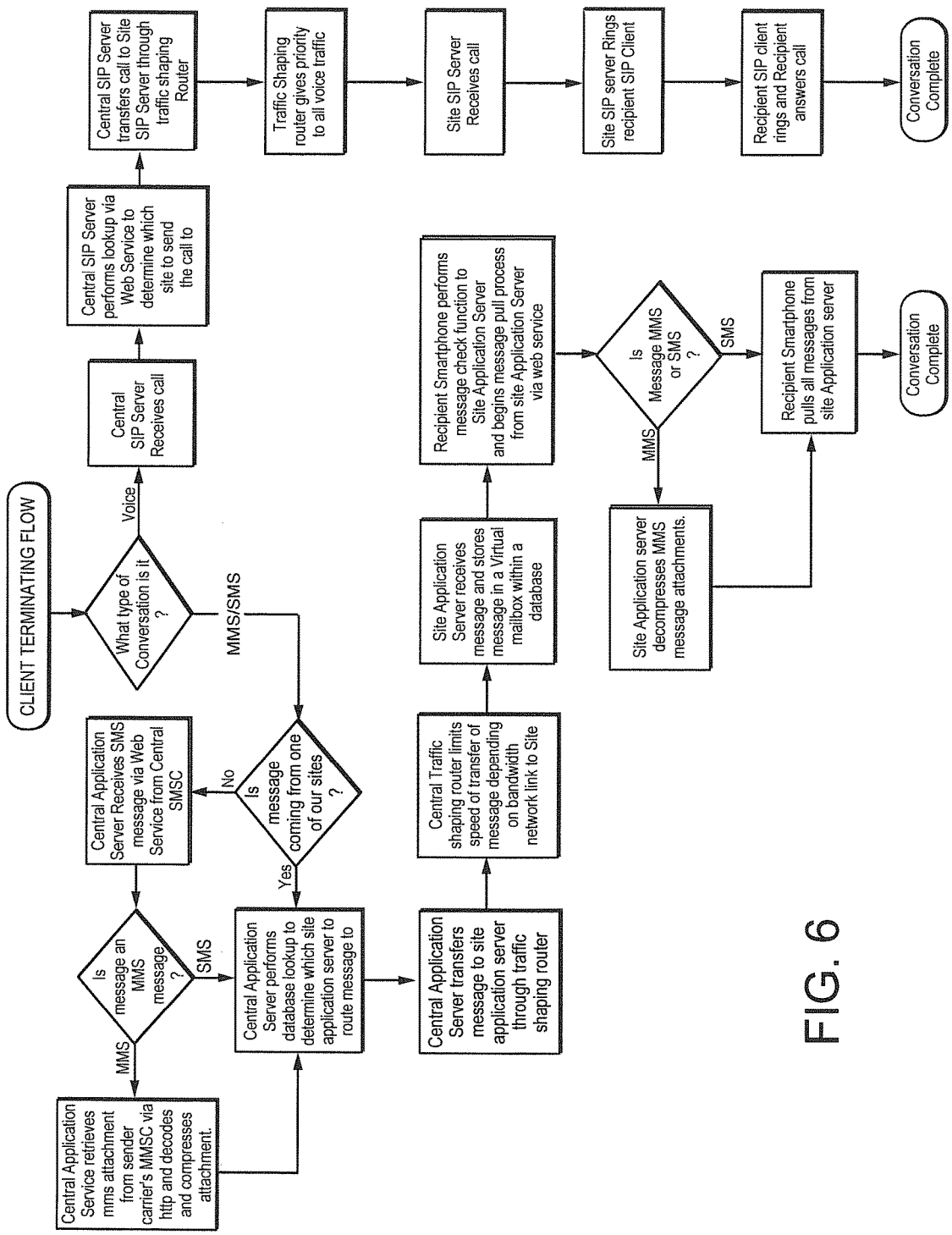
FIG. 6 is a flow diagram providing an alternate perspective and variations of a typical embodiment of the present invention for terminating and handling wireless data or voice.

FIG. 5 is a flow diagram providing an alternate perspective and variations of a typical embodiment of the present invention for initiating wireless data or voice communications on the On-Ship Application Server 20 (also referred to as the Site Application Server) and the Shoreside Gateway Server 30 (also referred to as the Central Application Server). FIG. 6 is a flow diagram providing an alternate perspective and variations of a typical embodiment of the present invention for terminating wireless data or voice communications on the On-Ship Application Server 20 (also referred to as the Site Application Server) and the Shoreside Gateway Server 30 (also referred to as the Central Application Server).

Indeed, while principally preferred embodiments have been described with reference to adaptations for use in the particular captive environment of a cruise ship, to the extent captured within the enforceable scope of any claims corresponding to these descriptions, alternative embodiments are comparably adapted for use in other captive environments. Such other captive environments for alternative embodiments namely include (without limitation) for use on other watercraft or on other vehicle platforms such as aircraft, trains, buses or the like, in ways that would be evident to those of skill in the art based on the claims as contemplated in light of the prior art and the foregoing descriptions or accompanying drawings. In addition, again only to the extent still falling within the enforceable scope of any corresponding claims (including under the doctrine of equivalents), still other alternative embodiments are adapted and configured for comparable use on military bases, on university or corporate campuses, or in commonly associated business and/or housing facilities. This could include, fishing vessels, satellite communications, airplanes, remote research outposts, oil rigs, remote residences, and others.

While the preferred embodiments have been described with certain features, many alternative embodiments will have more features than described herein, and many other alternatives will have fewer features and/or alternative features as will be understood to those of skill in the art. For instance, although certain preferred embodiments are focused on providing personal electronic communications, other embodiments may only provide one such form of communication, and still other embodiments may also provide other features such as data connectivity (i.e., Internet web service) and/or any number of other known handset features and/or services that can be enabled on or in conjunction with wireless handsets.

In some alternate embodiments, the User Wireless Device 10 could use a VoIP app on a smartphone, while it should be understood that particular embodiments may operate based on any available VoIP protocol depending on particular needs and functionality preferences. Certain preferred alternative embodiments include using Session Initiation Protocol (SIP) phones, while other alternatives are also envisioned with h.232, GSM phones, CDMA phones, LTE phones, public switched telephone network (PSTN) phones, or other wired, wireless, or wireless communications networks. With reference again to FIG. 1, a preferred embodiment is provided in the form of software that is installed and adapted to interact with the handset, servers and client support agents. It should be understood that the graphical representation of the system is an exemplary reference to any number of software systems that may be implemented by the present invention.

In some embodiments of the present invention, the method and systems described are provided via computer software, either via the Internet, via a stand-alone software application operating independently or in connection with other software systems, or some combination of the two. As well, embodiments may come in any known faint and may also be implemented by hardware, software, scripting languages, firmware, middleware, microcode, hardware description languages, and/or any combination thereof.

When implemented with coded programming, it should also be understood that the program code or code segments to perform the necessary steps or tasks of alternative embodiments may be coded in solid state or may be stored in a machine-readable medium such as a computer storage medium. A code segment or machine-executable step or instruction may represent a procedure, a function, a subprogram, a program, a routine, a subroutine, a module, a software package, a script, a class, or any combination of instructions, data structures, and/or program statements. Executable code segments may also be coupled to other code segments or to a hardware circuit by passing and/or receiving information, data, arguments, parameters, and/or memory contents, which may be passed, forwarded, or transmitted via any suitable means including memory sharing, message passing, token passing, network transmission, etc.

Specific details are given in the above description to provide a thorough understanding of various preferred embodiments. However, it is understood that these and other embodiments may be practiced without these specific details. For example, processes may be shown in block diagrams in order not to obscure the embodiments in unnecessary detail. In other instances, well-known processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have many additional steps not included in the figure. A process may correspond to a method, a function, a procedure, a subroutine, a subprogram, etc. When a process corresponds to a function, its termination corresponds to a return of the function to the calling function or the main function.

Embodiments of the invention may involve use middleware and/or other software implementation; the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may be downloadable through an internet connection service. As used herein the term "memory" refers to any type of long term, short term, volatile, nonvolatile, or other storage medium and is not to be limited to any particular type of memory or number of memories, or type of media upon which memory is stored.

Moreover, as disclosed herein, the ten "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

Although less preferred, some alternative embodiments of the invention may not be fully enabled to complete outbound calls on licensed cellular networks. Such alternative embodiments are referred to as "License-Disabled" to differentiate from other embodiments, because they fulfill most if not all the other functional and other characteristics as are described above, except that they are functionally unable to consummate an outbound call on a licensed cellular network. Hence, any outbound cellular call that may be initiated by an end user with such a License-Disabled embodiment would be dropped prior to (or rather than) being connected with an licensed cellular network. It is contemplated nonetheless that such a License-Disabled embodiment could be modified after being put in use in order to add the omitted functionality, either through securing and enabling rights to transmit on licensed cellular networks, or through removing or changing the state of a component that causes the embodiment not to have full functionality.

While the principles of the disclosure have been described above in connection with specific apparatuses and methods, it is to be clearly understood that this description is made only by way of example and not as limitation on the scope of the disclosure. Whether now known or later discovered, there are countless other alternatives, variations and modifications of the many features of the various described and illustrated embodiments, both in the process and in the system characteristics, that will be evident to those of skill in the art after careful and discerning review of the foregoing descriptions, particularly if they are also able to review all of the various systems and methods that have been tried in the public domain or otherwise described in the prior art. All such alternatives, variations and modifications are contemplated to fall within the scope of the present invention.

What is claimed is:

1. A system for providing alternate wireless and network service in remote or isolated captive environments where available wireless communication options are limited and/or bandwidth constrained, said system comprising:
   a) a wireless telecommunications device;
   b) a network translation application installed on said wireless telecommunications device;
   c) said network translation application being programmed to interface through a wireless communications network to an application server;
   d) said application server being connected to a gateway server and home service provider network via a roaming connection managed by said gateway server;
   e) said gateway server updating a visitor location register of said home service provider network and setting said wireless telecommunications device as roaming on the network of said gateway server;
   f) said application server being programmed to determine that a first wireless communication is between said wireless telecommunications device and a receiver registered on the same said application server and routing uncompressed wireless data for said first wireless communication through an internal network in said wireless communications network and managed by said application server;
   g) said application server being programmed to provide wireless data through said roaming connection when said internal network is unavailable or unable to provide said wireless data;
   h) in response to said receiver for a second wireless communication being located outside said internal network, said application server and gateway server being programmed to intelligently queue and manage delivery of compressed wireless data from said wireless telecommunications device through said application server and said gateway server,
   wherein said network translation application adds in conjunction to native wireless data or voice communications of said wireless communication device an alternate wireless data or voice communications method.

2. The system as in claim 1 wherein said application server applies quality of service prioritization to said wireless data or voice communication as required by any bandwidth constraints.

3. The system as in claim 1 wherein said application server consists of a local computer server and a remote server in communication with each other.

4. The system as in claim 1 wherein said application server consists of a single computer server.

5. The system as in claim 1 wherein said network translation application replaces said native wireless data or said voice communications of said wireless communication device.

* * * * *